United States Patent
Koral et al.

(10) Patent No.: US 11,025,519 B2
(45) Date of Patent: Jun. 1, 2021

(54) SYSTEMS, METHODS AND COMPUTER-READABLE MEDIA FOR EXTERNAL NON-INTRUSIVE PACKET DELAY MEASUREMENT

(71) Applicant: AT&T Intellectual Property I, L.P., Atlanta, GA (US)

(72) Inventors: Yaron Koral, Cherry Hill, NJ (US); Tuan Duong, Eatontown, NJ (US); Steven A. Monetti, Mountain Lakes, NJ (US); Tzuu-Yi Wang, Newtown, PA (US); Simon Tse, Holmdel, NJ (US); Shir Landau Feibish, Princeton, NJ (US); Jennifer Rexford, Princeton, NJ (US); Xiaoqi Chen, Princeton, NJ (US)

(73) Assignees: AT&T Intellectual Property I, L.P., Atlanta, GA (US); The Trustees Of Princeton University, Princeton, NJ (US)

( * ) Notice: Subject to any disclaimer, the term of this patent is extended or adjusted under 35 U.S.C. 154(b) by 0 days.

(21) Appl. No.: 16/380,484

(22) Filed: Apr. 10, 2019

(65) Prior Publication Data
US 2020/0328956 A1 Oct. 15, 2020

(51) Int. Cl.
*H04L 12/26* (2006.01)
(52) U.S. Cl.
CPC .......... *H04L 43/0858* (2013.01); *H04L 43/12* (2013.01)

(58) Field of Classification Search
CPC . H04L 43/0852; H04L 43/0858; H04L 43/12; H04L 45/60
See application file for complete search history.

(56) References Cited

U.S. PATENT DOCUMENTS

| 6,112,236 A * | 8/2000 | Dollin ..................... H04L 43/00 370/253 |
| 6,363,056 B1 | 3/2002 | Beigi et al. |
| 6,831,890 B1 * | 12/2004 | Goldsack ................ H04L 43/00 370/229 |
| 8,391,143 B2 | 3/2013 | Cohen et al. |
| 8,989,017 B2 | 3/2015 | Naouri et al. |
| 9,025,475 B1 | 5/2015 | Sorenson et al. |
| 9,077,479 B2 | 7/2015 | Kotrla et al. |
| 9,363,173 B2 | 6/2016 | Laor et al. |
| 9,942,146 B2 | 4/2018 | Florea et al. |
| 9,977,745 B2 | 5/2018 | Florea et al. |
| 10,021,007 B2 | 7/2018 | Edsall et al. |

(Continued)

*Primary Examiner* — Paul H Masur
(74) *Attorney, Agent, or Firm* — BakerHostetler

(57) ABSTRACT

Methods, systems, and computer-readable media for measuring packet delays are provided. An input port of a network device is tapped to duplicate an input packet stream having a first packet. An output port of the network device is tapped to duplicate an output packet stream including the first packet. The duplicated input packet stream and the duplicated output packet stream is transmitted to a programmable device. The first packet in the first input packet stream is matched to the first packet in the first output packet stream. An arrival time and a departure time for the first packet is measured. The difference between the departure time of the first packet and the arrival time of the first packet is determined and the value is reported to an external collector.

20 Claims, 4 Drawing Sheets

(56) References Cited

U.S. PATENT DOCUMENTS

| | | |
|---|---|---|
| 10,097,467 B1 | 10/2018 | Singh |
| 2003/0046388 A1* | 3/2003 | Milliken ............... H04L 41/046 |
| | | 709/224 |
| 2007/0081471 A1* | 4/2007 | Talley, Jr. ............... H04L 43/18 |
| | | 370/252 |
| 2014/0328206 A1* | 11/2014 | Chan ..................... H04L 43/12 |
| | | 370/253 |
| 2015/0281025 A1* | 10/2015 | Wallbaum ............. H04L 43/062 |
| | | 370/252 |
| 2016/0285744 A1 | 9/2016 | Panchagnula et al. |
| 2016/0323166 A1* | 11/2016 | Pandey ................... H04L 43/12 |
| 2017/0093665 A1* | 3/2017 | Armstrong ............ H04L 43/062 |
| 2018/0176133 A1 | 6/2018 | Ignatchenko |
| 2018/0183694 A1* | 6/2018 | Burke ................... H04L 43/087 |
| 2018/0375730 A1 | 12/2018 | Anand et al. |
| 2019/0140893 A1* | 5/2019 | Artzi ................... H04L 41/0659 |

* cited by examiner

SYSTEMS, METHODS AND COMPUTER-READABLE MEDIA FOR EXTERNAL NON-INTRUSIVE PACKET DELAY MEASUREMENT

GOVERNMENT RIGHTS

This invention was made with government support under Grant No. CCF-1535948 awarded by the National Science Foundation. The government has certain rights in the invention.

TECHNICAL FIELD

The present disclosure relates to analyzing performance of a network. More particularly, the disclosure relates to methods, systems, and computer-readable media for the external non-intrusive measurement of packet delays.

BACKGROUND

Carrier networks provides service to a large number of customers with wide variety of usage profile. For this reason, it is difficult to predict the actual bandwidth usage at any given point of time. Network planning assumes a certain profile of traffic, but this needs to be constantly monitored to accommodate traffic changes due to phenomena such as flash crowds or content delivery network (CDN) failure. For this reason, a router's resources should be constantly monitored with a high level of accuracy. One of the most important parameters to be monitored is the usage of the router buffers which corresponds to the current queue occupancy. For instance, an increase of the buffer usage may indicate a queue buildup, which in turn causes network delays and may reach the point where the buffer is full, and packets are dropped. Existing routers provide a buffer utilization measure in the form of a counter, but it only maintains the maximum utilization since all counters been last reset. So, it may reflect buffer utilization from the date the counter was last reset, which may be a period of months. To get more recent measure all counters have to be reset, thus affecting other system measurements from other counters. Another current approach is to estimate buffer utilization by relying on counters that count packet drops, i.e. after the damage was done and with very low information on what and when the queue buildup occurred.

There is a need to measure the buffer occupancy in a more accurate scalable manner without resetting the other system's counters by performing measurements external to the router.

SUMMARY

One general aspect includes a method including: making input copies of a plurality of input packets in at least one input packet stream transmitted to at least one input port of a device to be measured wherein the input copies comprise a plurality of copied input packets, and making output copies of a plurality of packets in at least one output packet stream transmitted from at least one output port of the device to be measured wherein the output copies comprise a plurality copied output packets. The method further includes transmitting the plurality of output copies and the plurality of input copies to a programmable device. The arrival time of each of the plurality of input copies and the departure time of each of the plurality of output copies are determined. The method further includes identifying a plurality matching packets from the plurality of copied output packets that match some of the plurality of copied input packets wherein each of the plurality of matching packets include the arrival time and the departure time of each of the plurality of matching packets. The method then determines a set of values comprising a difference between the departure time and the arrival time of each of the plurality of matching packets. In one aspect, the method also includes transmitting the set of values to a collector.

One general aspect includes a system having a network device connected to a network. The network device is provided with a plurality of input ports each adapted to receive an input packet stream and a plurality of output ports each adapted to transmit an output packet stream. The system also includes a plurality of input taps located upstream from the input ports where each of the plurality of input taps copies one of a plurality of input packet streams. A plurality of output taps located downstream from the output ports is also provided and where each of the plurality of output taps copy one of a plurality of output packet streams each comprising a set of output packets. The system includes a second network device having a clock for registering the arrival and departure time of the set of input packets and the set of output packets respectively. The second network device also includes a data store for storing the arrival time of each input packet in the set of input packets and the departure time for each output packet in the set of output packets. The second network device also includes a matching module for determining for each output packet in the set of output packets a corresponding input packet from the set of input packets and a time difference calculator for determining a set of values comprising difference between the departure time for each output packet in the set of output packets and an arrival time for the corresponding input packet. The second network device also includes a transmitter for transmitting the set of values.

In one aspect, a system performs the aforementioned matching on some or all of the packets inspected and computes the time difference for some or all of the packets observed. When only computing time difference for a subset of all observed packets, the system may optionally extrapolate to estimate the delays experienced by the remaining packets.

One general aspect includes a non-transitory computer readable storage medium having computer-executable instructions that, when executed, cause a computer system to make input copies of a plurality of input packets in at least one input packet stream transmitted to at least one input port of a device to be measured. The input copies comprise a plurality of copied input packets. The non-transitory computer readable storage medium also include instruction to make output copies of a plurality of packets in at least one output packet stream transmitted from at least one output port of the device to be measured wherein the output copies comprise a plurality of copied output packets. The non-transitory computer readable storage medium further includes instruction to transmit the output copies and the input copies to a programmable device. The arrival time of the input copies and the departure time of the output copies are determined. The non-transitory computer readable storage medium further includes instruction to identify a plurality matching packets from the copied output packets that match some of the copied input packets wherein each of the plurality matching packets include the arrival time and the departure time of each of the plurality of matching packets. The non-transitory computer readable storage medium further includes instruction determine a set of values comprising a difference between the departure time and the arrival time of each of the plurality of matching packets.

DETAILED DESCRIPTION OF ILLUSTRATIVE EMBODIMENTS

Glossary

Figure 1:
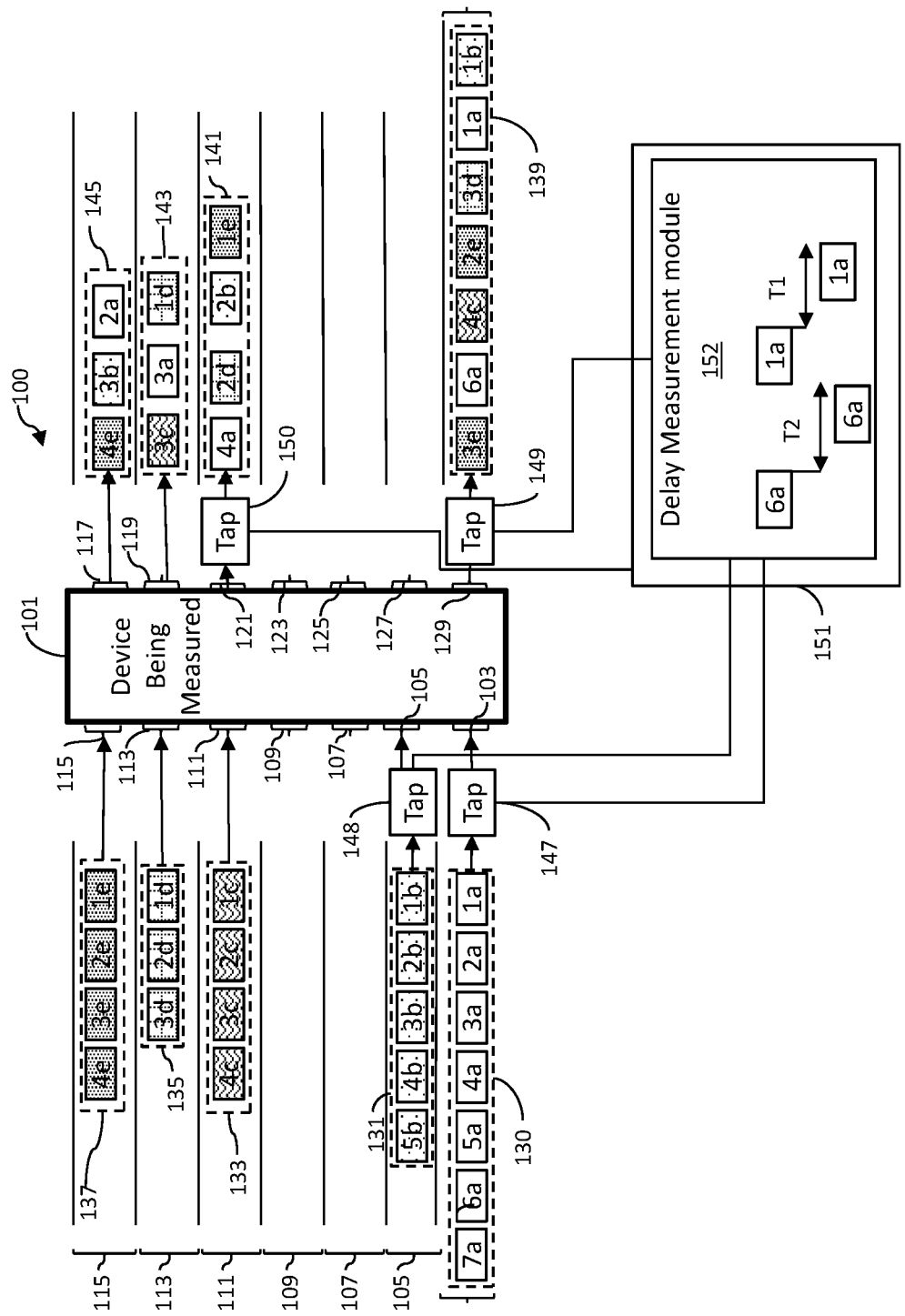
FIG. 1 is a block diagram illustrating an embodiment of a network device to be measured and a system for the external non-intrusive measurement of packet delays.

Destination IP. Destination IP is the IP address of the device to which the packet is being sent.

Hash Algorithm. A hash algorithm is any function that can be used to map data of arbitrary size to data of a fixed size. The values returned by a hash function are called hash values, hash codes, digests, or simply hashes. Hash functions are often used in combination with a hash table, a common data structure used in computer software for rapid data lookup. Hash functions accelerate table or database lookup by detecting duplicated records in a large file.

IP Address. An Internet Protocol address (IP address) is a numerical label assigned to each device connected to a computer network that uses the Internet Protocol for communication. An IP address serves two principal functions: host or network interface identification and location addressing.

MPLS. Multiprotocol Label Switching (MPLS) is a protocol-agnostic routing technique designed to speed up and shape traffic streams across enterprise wide area and service provider networks. MPLS is a more efficient alternative to traditional IP routing, which requires each router to independently determine a packet's next hop by inspecting the packet's destination IP address before consulting its own routing table. This process consumes time and hardware resources, potentially resulting in degraded performance for real-time applications such as voice and video. In an MPLS network, the very first router to receive a packet determines the packet's entire route upfront, the identity of which is quickly conveyed to subsequent routers using a label in the packet header.

MPLS-EXP. The MPLS experimental bits (EXP) field is a 3-bit field in the MPLS header that can be used to define the QoS treatment (per-hop behavior) that a node should give to a packet. The EXP bits can be used to carry some of the information encoded in the IP DSCP and can also be used to encode the dropping precedence.

P4. P4 (Programming Protocol-Independent Packet Processors) is a domain-specific language for expressing how packets are processed by the data plane of a programmable forwarding element, such as a hardware or software switch, network interface card, router, or network appliance. P4 provides a developer with a basic set of instruments to implement a network stack in switching hardware. One can operate with such abstractions as header types (sets of fields and their sizes), parsers (how headers are organized together, how to distinguish between them, etc.), tables for associating user-defined keys with actions, counters, meters etc.

Programmable Router. Programmable router chips allow operators to program parts of the data plane: the part of the network that forwards packets based on the routing tables. For instance, these chips allow an operator to program the router's parser to recognize new packet headers, such as a new overlay format. They also allow the operator to program packet header transformations (e.g., decrementing the IP TTL field) so long as these transformations do not modify router state.

Queuing delay. Queuing delay is the time a job waits in a queue until it can be executed. It is a key component of network delay. In a packet-switched network, queuing delay is the sum of the delays encountered by a packet between the time of insertion into the network and the time of delivery to the address. This term is most often used in reference to routers. When packets arrive at a router, they have to be processed and transmitted. A router can only process one packet at a time. If packets arrive faster than the router can process them (such as in a burst transmission) the router puts them into the queue (also called the buffer) until it can get around to transmitting them. Delay can also vary from packet to packet, so averages and statistics are usually generated when measuring and evaluating queuing delay.

Router Buffer. Each router in a data network has its own buffer. It means router's memory bank, where it can pass packets at minimum data rates. Router also modify packet to transfer information about network conditions. For example, the packet encountered congestion, where, and for how long; it might even want to suggest new transmission rates for senders.

Source IP. Source IP is the IP (Internet Protocol) address of the device sending the IP packet (the IP unit of data transfer).

Tap. A Network TAP (Terminal Access Point) denotes a system that monitors events on a local network and in order to aid administrators (or attackers) in analyzing the network. The tap itself is typically a dedicated hardware device, which provides a way to access the data streaming across a computer network. In many cases, it is desirable for a third party to monitor the traffic between two points in the network. A tap inserted between A and B passes all traffic (send and receive data streams) through unimpeded in real time, but also copies that same data to its monitor port, enabling a third party to listen.

FIG. 1 illustrates an embodiment of network environment for the external non-intrusive measurement of packet delays of a device to be measured 101 such as, for example, a router or switch. The device to be measured 101 includes multiple ingress ports and multiple egress ports. For example, the device to be measured 101 may include a plurality of input ports (e.g. input port 103, input port 105, input port 107, input port 109, input port 111, input port 113, and input port 115). Although in this example seven input ports are described, the present disclosure contemplates any number of input ports may be associated with the device to be measured 101. The device to be measured 101 also includes a plurality of output ports (e.g. output port 117, output port 119, output port 121, output port 123, output port 125, output port 127, and output port 129). Although in this example seven output ports are described, the present disclosure contemplates any number of output ports that may be associated with the device to be measured 101.

The device to be measured 101 receives a plurality of input streams through the various input ports. For example, input stream 130 (shown in dashed lines) may comprise a plurality of packets, for example packet 1a, 2a, 3a, 4a, 5a, 6a, and 7a. Input stream 131 may include packets 1b, 2b, 3b, 4b, and 5b. Input stream 133 may include packets 1c, 2c, 3c, and 4c. Input stream 135 may include packets 1d, 2d and 3d, and input stream 137 may include packets 1e, 2e, 3e, and 4e.

The device to be measured 101 provides a plurality of output streams through the various output ports. For example, output stream 139 may include packets 3e, 6a, 4c, 2e, 3d, 1a and 1b as output from port 129. Output stream 141 may include packets 4a, 2d, 2b, and 1e as output from port 121. Output stream 143 may include packets 3c, 3a, and 1d as output from port 119. And output stream 145 may include packets 4e, 3b and 2a as output from port 117.

In an embodiment, a plurality of upstream (input) taps (e.g. input taps 147 and 148) and a plurality of downstream (output) taps (e.g. output taps 149 and 150) may be attached to the ingress (incoming) and egress (outgoing) links (ports) to the device to be measured 101. In an embodiment the plurality of upstream taps and the plurality of downstream taps may be installed in a subset of all the input and output ports of the device to be measured 101. So, for example, in an embodiment, upstream tap 147 may tap input port 103 and upstream tap 148 may tap input port 105 so that only two input ports are tapped. In other embodiments all or a subset of all input ports may be tapped. Similarly, in an embodiment downstream tap 149 may tap output port 129 and downstream tap 150 may tap output port 121. In other embodiments all or a subset of all output ports may be tapped. A programmable network device (e.g. a programmable switch) 151 is coupled to the taps (e.g. upstream tap 147 upstream tap 148 and downstream tap 149 and downstream tap 150). The programmable network device 151 includes a delay measurement module 152 that correlates (matches) ingress packets to egress packets and measures the time difference between their arrival to the programmable network device 151 and a departure from the programmable network device 151 thereby measuring the queuing delay. So, for example, the delay measurement module 152 may identify that output stream 139 from the tapped output port 129 may include packet 6a and packet 1a that correspond to packet 6a and packet 1a from input stream 130 into tapped input port 103. The delay measurement module 152 may determine the arrival time of packet 6a into input port 103 and the departure time of packet 6a from the output port 129. The delay measurement module 152 may calculate the difference between the departure time and the arrival time to determine the residence time of the packet in the buffer of the device to be measured 101 (e.g. the router buffer). Similarly, the delay measurement module 152 may calculate the difference between the departure, the arrival time of packet 1a to determine the residence time of the packet 1a in the buffer of the device to be measured 101. In the case of packet 3e in output stream 139, there is no measurement of the arrival time of packet 3e in input stream 137 because port 115, the port receiving the input stream 137 is not tapped. In that case, the delay measurement module 152 determines that there is no corresponding input packet 3e and the output packet 3e is ignored. In the example illustrated in FIG. 1, the delay measurement module 152 may determine that there is a match of packets 1a, and 6a, in output stream 139 from tapped output port 149 and packets 1a, 6a from input stream 130 from tapped input port 103. Similarly, the delay measurement module 152 may determine that there is a match of packet 2b in output stream 141 from tapped output port 121 and packet 2b in input stream 131 from tapped input port 105.

The plurality of taps e.g. upstream taps 147 and 148 and output taps 149 and 150), the programmable network device 151 and its associated delay measurement module comprise a system for external non-intrusive packet delay measurement.

Figure 2:
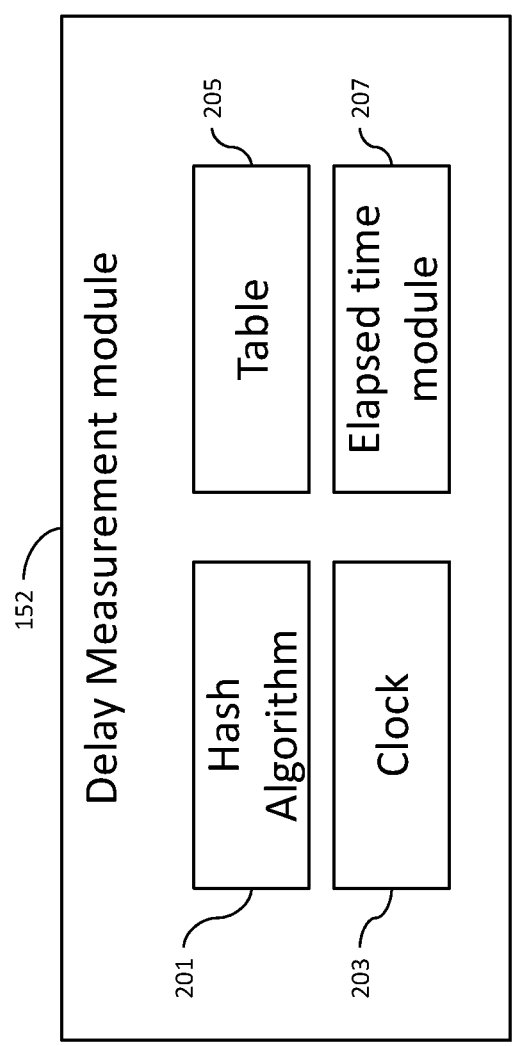
FIG. 2 is a block diagram illustrating an embodiment of the components of a delay measurement module used in a system for the external non-intrusive measurement of packet delays.

Illustrated in FIG. 2 are the components of the delay measurement module 152, which include a hash algorithm 201, a clock 203, a table 205 and an elapsed time module 207. For each received ingress packet a hash value is calculated using the hash algorithm 201 based on several parameters that are unique to the packets. These parameters may include the packet header and may also include several bytes from its payload. Parameters may also include source IP address, destination IP address, source port address, destination port address, TCP sequence number, etc. The hash value calculated for the packet is used as the packet's index. The delay measurement module creates table 205 that consists of the packet index and its arrival time. For each egress packet, the delay measurement module 152 calculates its index in a similar way to the ingress packets, extracts its corresponding entry and subtracts the arrival time of the packets from the departure time to determine the time difference. The time difference reflects the queuing delay, that is the period of time that packet was "delayed" in the router. In cases where an egress packet had no corresponding entry generated from an ingress packet, it is assumed that this packet arrived from a non-covered (untapped) port and is ignored. For the case where a packet departed from a non-covered egress link the delay measurement module 152 cleans the ingress packets from the table after a predetermined period of time. A feature supported by the delay measurement module 152 is multiple priorities and measurements of multiple queues. When a network such as an MPLS network supports different kinds of services and different kinds of quality of service there may be several queues with several different occupancies. The system can be extended to support tracking time delays in several queues given the criteria that is based on the packet header. For example, if an MPLS-EXP bits are used, the system can calculate separate delays for packets with different EXP values.

Figure 3:
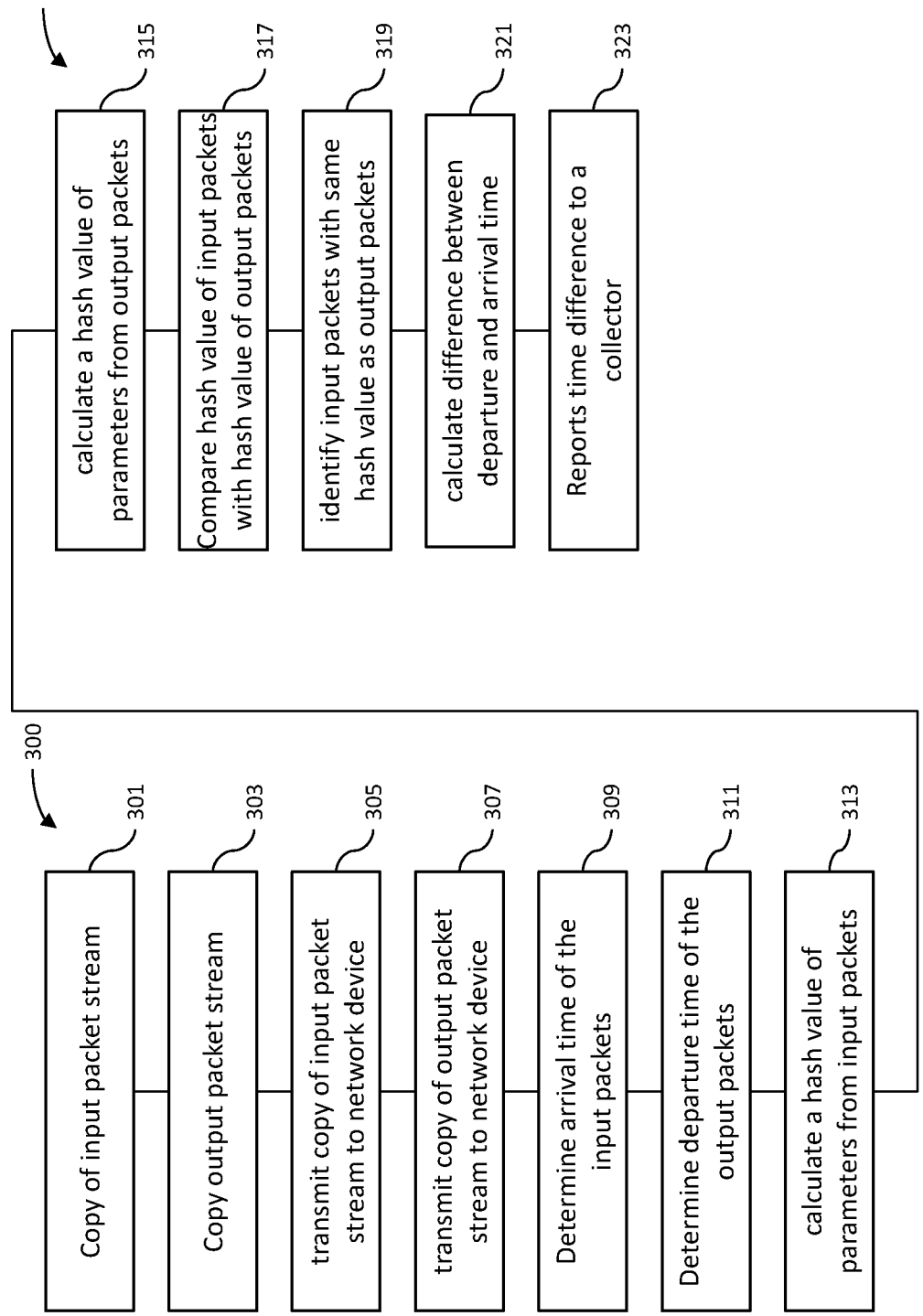
FIG. 3 is a flowchart of an embodiment of a method for the external non-intrusive measurement of packet delays.

Illustrated in FIG. 3 is a flowchart of a method 300 for the external nonintrusive measurements of packet delays.

In step 301, the method 300 makes a copy of an input packet stream, comprising a first set of input packets, to an input port in a device to be measured 101 to be measured. This may be accomplished with a tap on the input port. In other embodiments a plurality of upstream taps may be used to copy a plurality of input packet streams entering the tapped input ports.

In step 303, the method 300 makes a copy of an output packet stream, comprising a first set of output packets, to an output port of the device to be measured 101. This may be accomplished with a tap on the output port. In other embodiments a plurality of downstream taps may be used to copy a plurality of output packet streams exiting the tapped output ports.

In step 305, the method 300 transmits the copy of the tapped input packet stream (or in the embodiment where multiple input ports are tapped, copies of the tapped input packet streams) to a programmable network device 151.

In step 307, the method 300 transmits the copy of the output packet stream (or in the embodiment where multiple output ports are tapped, copies of the tapped output packet streams) to the programmable network device 151.

In step 309, the method 300 determines the arrival time of the input packets in the first set of input packets arriving at a tapped input port of the device to be measured 101. In the embodiment where a plurality of input ports is tapped, the arrival times of each packet in the plurality of packet streams entering the tapped input ports is determined.

In step 311, the method 300 measures the departure time of the output packets in the first set of output packets. In the embodiment where a plurality of output ports is tapped, the departure times of each packet in the plurality of packet streams exiting the tapped output ports are determined.

In step 313, the method 300 calculates a first hash value of selected parameters from the input packets for each input packet in the first set of input packets. In the embodiment where a plurality of input ports is tapped, the hash value of each packet in the plurality of packet streams entering the tapped input ports are calculated.

In step 315, the method 300 calculates a second hash value of the selected parameters from the output packets in the first set of output packets. In the embodiment where a plurality of output ports is tapped, the hash value of each packet in the plurality of packet streams exiting the tapped output ports are calculated.

In step 317, the method 300 compares the first hash value of each of the input packets in the first set of input packets with the second hash value of each of the output packets in the first set of output packets. In the embodiment where a plurality of input ports is tapped, the hash value of each packet in the plurality of packet streams entering the tapped input ports are compared with the hash value of each packet in the plurality of packet streams exiting the tapped output ports.

In step 319, the method 300 identifies input packets having an identical hash value to output packets to create a set of matching input packets that match a set of matching output packets.

In step 321, the method 300 calculates the difference between the departure time of matching output packets and the arrival time of the matching input packets.

In step 323, the method 300 reports the time difference to a collector.

Figure 4:
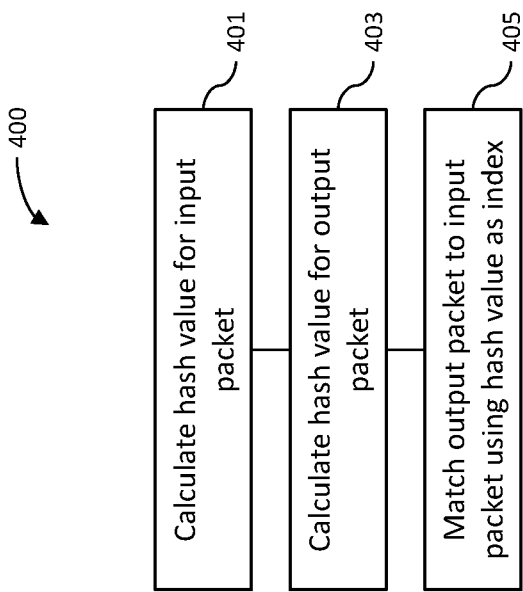
FIG. 4 is a flowchart of an embodiment of a method of matching output to input packets.

Illustrated in FIG. 4 is an embodiment of a method 400 for matching an output packet to an input packet.

In step 401, the method 400 calculates a hash value for the input packets based on several parameters that are unique to the packets. The parameters may include packet header and may also include several bytes from its payload. Additional parameters may include source IP address, destination IP address, source port address, destination port address, TCP sequence number etc.

In step 403, method 400 calculates a hash value for the output packets based on the parameters used to calculate the hash value for the input packets.

In step 405, the method 400 matches the output packet to the input packet using the hash value as an index.

Embodiments within the scope of the disclosed technology may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the disclosed technology are part of the scope of this disclosure. Accordingly, the appended claims and their legal equivalents should only define the disclosed technology, rather than any specific examples given.

What is claimed is:

1. A method comprising:
   making input copies of a plurality of input packets in at least one input packet stream transmitted to at least one input port of a device to be measured wherein the input copies comprise a plurality of copied input packets;
   making output copies of a plurality of packets in at least one output packet stream transmitted from at least one output port of the device to be measured wherein the output copies comprise a plurality of copied output packets;
   transmitting the output copies to a programmable device;
   transmitting the input copies to the programmable device;
   determining an arrival time of each of the input copies;
   determining a departure time of each of the output copies;
   identifying, from the plurality of copied output packets, a plurality of matching packets that match some of the plurality of copied input packets wherein each of the plurality of matching packets include the arrival time and the departure time of each of the plurality of matching packets;
   determining a set of values comprising a difference between the departure time and the arrival time of each of the plurality of matching packets;
   identifying a first type of quality of service for a first packet of the matching packets;
   identifying a second type of quality of service for a second packet of the matching packets, wherein the first type is different from the second type, wherein the first type of quality of service and the second type of quality of service are identified by the use of multiprotocol label switching (MPLS)-experimental (MPLS-EXP) bits indicative of different MPLS-EXP values; and
   tracking for multiple queues separate queuing delays of the first type of quality of service and the second type of quality of service, wherein the tracking for multiple queues is based on a determination of separate delays for packets with different MPLS-EXP values.

2. The method of claim 1 wherein the device to be measured is a router.

3. The method of claim 1 wherein the programmable device is a programmable switch.

4. The method of claim 1 further comprising transmitting the set of values to a collector.

5. The method of claim 1 further comprising creating an input packet index for each of the plurality of copied input packets and an output packet index for each of the plurality of copied output packets.

6. The method of claim 1 further comprising calculating a hash value for each of the plurality of copied input packets and each of the plurality of copied output packets.

7. The method of claim 6 wherein calculating the hash value comprises using a hash algorithm based on parameters that are unique to each of the plurality of copied input packets and each of the plurality of copied output packets, wherein the parameters comprise a port address.

8. A non-transitory computer readable storage medium having computer-executable instructions that, when executed by a processor of the computer system, cause a computer system to:
make input copies of a plurality of input packets in at least one input packet stream transmitted to at least one input port of a device to be measured wherein the input copies comprise a plurality of copied input packets;
make output copies of a plurality of packets in at least one output packet stream transmitted from at least one output port of the device to be measured wherein the output copies comprise a plurality of copied output packets;
determine an arrival time at a programmable device of each of the input copies;
determine a departure time from the programmable device of each of the output copies;
identify, from the copied output packets, a plurality matching packets that match some of the copied input packets wherein each of the plurality matching packets include the arrival time and the departure time of each of the plurality of matching packets;
determine a set of values comprising a difference between the departure time and the arrival time of each of the plurality of matching packets;
identifying a first type of quality of service for a first packet of the matching packets;
identifying a second type of quality of service for a second packet of the matching packets, wherein the first type is different from the second type, wherein the first type of quality of service and the second type of quality of service are identified by the use of multiprotocol label switching (MPLS)-experimental (MPLS-EXP) bits indicative of different MPLS-EXP values; and
tracking for multiple queues separate queuing delays of the first type of quality of service and the second type of quality of service, wherein the tracking for multiple queues is based on a determination of separate delays for packets with different MPLS-EXP values.

9. The non-transitory computer readable storage medium of claim 8 wherein the device to be measured is a router.

10. The non-transitory computer readable storage medium of claim 8 further comprising instructions that when executed cause the computer system to create an input packet index.

11. The non-transitory computer readable storage medium of claim 10 wherein the computer-executable instructions that, when executed, cause the computer system to create the input packet index comprises computer-executable instructions that, when executed, cause the computer system to calculate a hash value of a set of parameters associated with the copied input packets.

12. The non-transitory computer readable storage medium of claim 8 further comprising instructions that when executed cause the computer system to create an output packet index.

13. The non-transitory computer readable storage medium of claim 12 wherein the computer-executable instructions that, when executed, cause the computer system to create the output packet index comprises computer-executable instructions that, when executed, cause the computer system to calculate a hash value of a set of parameters associated with the copied output packets.

14. A system comprising:
one or more processors; and
memory coupled with the one or more processors, the memory storing executable instructions that when executed by the one or more processors cause the one or more processors to effectuate operations comprising:
make input copies of a plurality of input packets in at least one input packet stream transmitted to at least one input port of a device to be measured wherein the input copies comprise a plurality of copied input packets;
make output copies of a plurality of packets in at least one output packet stream transmitted from at least one output port of the device to be measured wherein the output copies comprise a plurality of copied output packets;
determine an arrival time at a programmable device of each of the input copies;
determine a departure time from the programmable device of each of the output copies;
identify, from the copied output packets, a plurality matching packets that match some of the copied input packets wherein each of the plurality matching packets include the arrival time and the departure time of each of the plurality of matching packets; and
determine a set of values comprising a difference between the departure time and the arrival time of each of the plurality of matching packets;
identifying a first type of quality of service for a first packet of the matching packets;
identifying a second type of quality of service for a second packet of the matching packets, wherein the first type is different from the second type, wherein the first type of quality of service and the second type of quality of service are identified by the use of multiprotocol label switching (MPLS)-experimental (MPLS-EXP) bits indicative of different MPLS-EXP values; and
tracking for multiple queues separate queuing delays of the first type of quality of service and the second type of quality of service, wherein the tracking for multiple queues is based on a determination of separate delays for packets with different MPLS-EXP values.

15. The system of claim 14, wherein the device to be measured is a router.

16. The system of claim 14, wherein the programmable device is a programmable switch.

17. The system of claim 14 further comprising transmitting the set of values to a collector.

18. The system of claim 14 further comprising creating an input packet index for each of the plurality of copied input packets and an output packet index for each of the plurality of copied output packets.

19. The system of claim 14 further comprising calculating a hash value for each of the plurality of copied input packets and each of the plurality of copied output packets.

20. The system of claim 19, wherein calculating the hash value comprises using a hash algorithm based on parameters that are unique to each of the plurality of copied input packets and each of the plurality of copied output packets.

* * * * *